United States Patent [19]

Erwied et al.

[11] 4,380,597

[45] Apr. 19, 1983

[54] THERMOPLASTIC COMPOSITIONS BASED ON VINYL CHLORIDE POLYMERS STABILIZED WITH POLYHYDROXYL COMPOUNDS

[75] Inventors: Werner Erwied, Langenfeld; Bernd Wegemund, Haan, both of Fed. Rep. of Germany

[73] Assignee: Henkel Kommanditgesellschaft auf Aktien, Dusseldorf-Holthausen, Fed. Rep. of Germany

[21] Appl. No.: 313,281

[22] Filed: Oct. 21, 1981

[30] Foreign Application Priority Data

Nov. 6, 1980 [DE] Fed. Rep. of Germany ....... 3041887

[51] Int. Cl.³ .......................... C08K 5/05; C08K 5/09; C08K 5/13; C08L 27/06
[52] U.S. Cl. ..................................... 524/109; 252/403; 264/211; 524/284; 524/301; 524/320; 524/399; 524/400; 524/567; 524/569
[58] Field of Search ................ 524/58, 567, 569, 284, 524/301, 320, 399, 400, 109; 252/183, 403; 264/211

[56] References Cited

U.S. PATENT DOCUMENTS

| | | | |
|---|---|---|---|
| 2,432,296 | 12/1947 | Dorough | 524/58 |
| 3,415,891 | 12/1968 | Turumaru et al. | 524/320 |
| 3,639,312 | 2/1972 | Turner | 524/58 |
| 4,206,103 | 6/1980 | Kromolicki et al. | 524/58 |
| 4,251,403 | 2/1981 | Rees | 524/58 |
| 4,269,743 | 5/1981 | Hulyalkar et al. | 524/567 |
| 4,283,315 | 8/1981 | James | 524/567 |

FOREIGN PATENT DOCUMENTS 449251 4/1968 Switzerland .
1179325 1/1970 United Kingdom .

OTHER PUBLICATIONS

Noller, Chemistry of Organic Compounds, W. B. Saunders Company, Philadelphia, Penn., 1951, pp. 352–354.

*Primary Examiner*—Ronald W. Griffin
*Attorney, Agent, or Firm*—Hammond & Littell, Weissenberger and Muserlian

[57] ABSTRACT

A stabilized thermoplastic composition comprised of polyvinyl chloride or mixed polymers containing mainly vinyl chloride units together with stabilizers and other conventional additives employed in thermoplastic compositions, which have as major stabilizer component, a content of 0.02 to 5 parts by weight of aliphatic polyhydroxyl compounds containing 4 to 6 OH-groups per 100 parts by weight of polymer. These polyhydroxyl compounds should contain at least one carboxyl and/or carbonyl group and/or double bond. Suitable compounds are gluconic acid, glucuronic acid, ketogluconic acid, ascorbic acid or the alkali metal salts or alkaline earth salts of the mentioned acids.

Other conventional processing additives may be present. The invention concerns also a process for the manufacture of pipes, profiles, foils, hollow parts by hot forming, with the use of the mentioned additives, and the additional use of paraffin, free fatty acid, epoxidized soybean oil or higher molecular weight ester wax.

26 Claims, No Drawings

THERMOPLASTIC COMPOSITIONS BASED ON VINYL CHLORIDE POLYMERS STABILIZED WITH POLYHYDROXYL COMPOUNDS

BACKGROUND OF THE INVENTION

The subject of the present invention are processing additives for use in the thermoplastic forming of polymers, especially on a basis of mixed polymers containing mainly vinyl chloride units. These thermoplastic compositions contain heat stabilizers from the group of the metallic soaps, metallic phenolates, organotin compounds and similar substances as well as other conventional additives that are used in this plastics technology.

A degradation of polyvinyl chloride and mixed polymers containing vinyl chloride units can easily occur at the elevated temperatures applied during the processing of the thermoplastic polymers, for example, for the manufacture of pipes, bottles, profiles and similar goods by extrusion, injection molding, blowing and similar methods. This results in undesirable discolorations and impairment of the mechanical properties. For this reason, stabilizers are added for the hot forming process that counteract such a degradation. These are, for example, lead salts of organic and/or inorganic acids, barium, cadmium, calcium, zinc and other metallic salts of fatty acids or also organotin compounds.

Frequently so-called co-stabilizers are added to such compounds that also are called primary stabilizers, to improve their effectiveness.

The heavy metal stabilizers develop an absolutely satisfactory effect in actual practice. However, there are certain objections to their use, particularly those of a toxicological nature. For this reason, efforts have been made for a long time to substitute less objectionable substances for the conventional heavy metal stabilizers. To accomplish this the heavy metal stabilizers have been replaced by soaps of the lighter alkaline earth metals, preferably calcium soap, which is supplemented with additions of zinc soap, imino compounds and epoxy compounds, if desired.

The stabilizing effect of the calcium soap system is relatively weak in comparison with that of the heavy metal compounds. Consequently, the range of application has been quite limited so far for such stabilizer systems.

OBJECTS OF THE INVENTION

An object of the present invention was to find such combinations of processing additives, that is, of heat stabilizers, that bring about an improvement in the long-term stability with simultaneous good initial color in contrast to the known heavy metal stabilizers.

Another object of the invention consists of developing such combinations that allow the elimination of the expensive and frequently used dialkyltin compounds.

A further object of the present invention is the development of a stabilized thermoplastic composition comprised of polyvinyl chloride or mixed polymers containing mainly vinyl chloride units and a stabilizer addtive composition of:

(1) heat stabilizers selected from the group consisting of metallic soaps, metallic phenolates and naphthenates and organotin compounds, and
(2) other conventional additives employed in thermoplastic compositions, wherein said heat stabilizers include from 0.02 to 5 parts by weight, per 100 parts by weight of polymer, of at least one aliphatic hydrocarbon having 6 carbon atoms, from 4 to 6 hydroxyl groups and at least one further characteristic group selected from the group consisting of carboxyl groups, carbonyl groups, double bonds and mixtures thereof.

These and other objects of the invention will become more apparent as the description thereof proceeds.

DESCRIPTION OF THE INVENTION

The problems of the prior art have been overcome and the above objects have been achieved according to the invention by the use of a combination of heat stabilizers from the group of the metallic soaps, phenolates, organotin compounds and similar substances as well as conventional flow promoters and other additives, which are characterized by the fact that it has an additional content (calculated for 100 parts by weight of polymer) of 0.05 to 5 parts by weight of aliphatic hydroxyl compounds with 4 to 6 OH-groups with at least one additional carboxyl and/or carbonyl group and/or double bond.

More particularly, the present invention relates to a stabilized thermoplastic composition comprised of polyvinyl chloride or mixed polymers containing mainly vinyl chloride units and a stabilizer additive composition of:

(1) heat stabilizers selected from the group consisting of metallic soaps, metallic phenolates and naphthenates and organotin compounds, and
(2) other conventional additives employed in thermoplastic compositions, wherein said heat stabilizers include from 0.02 to 5 parts by weight, per 100 parts by weight of polymer, of at least one aliphatic hydrocarbon having 6 carbon atoms, from 4 to 6 hydroxyl troups and at least one further characteristic group selected from the group consisting of carboxyl groups, carbonyl groups, double bonds and mixtures thereof.

According to a preferred embodiment, the stabilizer combination for the thermoplastic polymer contains, as aliphatic hydroxyl compounds, gluconic acid and/or glucuronic acid and/or ketogluconic acid and/or ascrobic acid or their alkali metal and/or alkaline earth metal salts.

Further more, the additional use of 0.5 to 5 parts by weight of a calcium salt of fatty acids with 8 to 22 carbon atoms as well as 0.2 to 2 parts by weight of a zinc salt of fatty acids with 8 to 22 carbon atoms per 1 part by weight of the aliphatic hydroxyl compound in the combination may be advantageous. Also advantageous under certain conditions may be the partial or complete substitution of the fatty acid salts by phenolates or naphthenates, optionally containing alkyl groups, of these metals. So-called superbasic phenolates or naphthenates are also suitable additives, if desired.

The addition of the stabilizer combinations of 0.2 to 5 parts by weight of a synthetic, crystalline, powdered sodium aluminosilicate containing 13% to 25% by weight of water of crystallization which, based on the anhydrous form, has the composition:

0.7 to 1.1 $Na_2O \cdot Al_2O_3 \cdot 1.3$ to 2.4 $SiO_2$ per 1 part by weight of the aliphatic hydroxyl compound may be advantageous in many cases. Such zeolites are known as additives in the processing of thermoplastics.

Also suitable as additives are partial esters of polyhydric alcohols, such as lower alkanepolyols or lower alkoxy-lower alkanepolyols, for example, esters of glycerol, trimethylol-propane or particularly of pentaerythritol or dipentaerythritol. These are prepared by a well known method by the esterification with fatty acids with a chain length of 8 to 22 carbon atoms.

Fatty acids to be mentioned as suitable are, for example, lauric acid, myristic acid, palmitic acid, stearic acid or behenic acid. Synthetic fatty acids of the mentioned chain length, such as montanic acid or also unsaturated acids, such as oleic acid, linolenic acid or also substituted fatty acids, for example, 12-hydroxystearic acid, may be used as well. When pentaerythritol is used, the ratio of pentaerythritol to fatty acid should lie in the range from 1:1 to 1:2. The partial esters shall have an OH-number between 140 and 580, especially 170 and 450. The acid number of the reaction product shall be below 15, especially below 8. The amount of ester should be 0.2 to 2.0 parts by weight, calculated for 1 part by weight of the aliphatic hydroxyl compound.

The additional use of 0.1 to 3.0 parts by weight of thioglycolate of an alcohol with 1 to 6 hydroxyl groups and 3 to 36 carbon atoms per 1 part by weight of the aliphatic hydroxyl compound may also be advantageous. Such esters are, for example, an ester of thioglycolic acid with an alkanol having from 3 to 36 carbon atoms or an ester or partial ester of thioglycolic acid with an alkanepolyol having from 3 to 36 carbon atoms and 2 to 6 hydroxyl groups. Suitable are esters of low volatility, such as thioglycolic acid esters of glycerol, trimethylolpropane, isomeric octanols, decanol, Guerbert alcohol from octanols or also technical, dimerized fatty alcohol. These esters may also contain free hydroxyl groups, if desired, and the additional use of the free polyhydric alcohols is also possible.

Because of the particularly favorable effect of organic tin compounds, these can also be used additionally in smaller amounts. Approximately 0.05 to 1.0 parts by weight of organotin compound per 1 part by weight of aliphatic hydroxyl compound are suitable in this case. If desired, an addition of phenolates from the group of the alkaline earth metal phenolates may be advantageous. This is usually barium nonylphenolate.

Finally, a favorable effect can be obtained, if desired, by the addition of 0.02 to 0.5 part by weight of a 1,3-dicarbonyl compound per 1 part by weight of the aliphatic hydroxyl compound in the stabilizer combinations. These compounds and their use as stabilizers for PVC are well known. Generally suitable are those 1,3-diketones that contain also at least two alkyl, aryl or aralkyl groups, such as dodecyl, hexadecyl, octadecyl, phenyl or benzyl in the molecule. Preferably the 1,3-dicarbonyl compounds are compounds having the formula:

$$R_1-\overset{O}{\underset{\|}{C}}-CH_2-\overset{O}{\underset{\|}{C}}-R_2$$

wherein $R_1$ and $R_2$ are members selected from the group consisting of alkyl having from 3 to 24 carbon atoms, phenyl, and phenylalkyl having from 1 to 8 carbon atoms in the alkyl. Consequently, palmitoylsteroyl methane or stearoylbenzoyl methane are representative of this type.

Other suitable additives are waxlike hydrocarbons, such as paraffin with a congealing point of 50° to 90° C. and/or low molecular polyethylene types with a softening point of below 140° C. It is advantageous to combine these waxlike hydrocarbons with free fatty acids, those fatty acids with 12 to 22 carbon atoms that are obtained during the processing of natural fats being preferred. Favorable results are obtained with the use of palmitic and stearic acid. Fatty alcohols also may be used together with the former.

Finally, certain polymers are suitable as further conventional additives in stabilized thermoplastic compositions. These additives are, for example, polymers of methyl methacrylate, methyl methacrylate/butyl acrylate, ethyl acrylate, methyl methacrylate/butyl-(meth)acrylate/styrene. Such polymers or copolymers are called flow promoters. Polymers of butyl acrylate also act as parting compounds for the processing of polyvinyl chloride and other mixed polymers based on vinyl chloride.

When necessary, antioxidants also may be added for the thermoplastic processing of vinyl chloride polymers. Suitable for this purpose are, for example:
diphenylol propane, or also
2,5-bis-(1,1-dimethyl propyl)-hydroquinone,
2,6-di-tert.-butyl-4-methylphenol,
octadecyl-(3,5-di-tert.-butyl-4-hydroxyphenyl)-propionate,
1,1,3-tris-(5-tert.-butyl-4-hydroxy-2-methylphenyl)-butane, dilauryl thiodipropionate.

The stabilizer mixtures according to the invention develop a good stabilizing effect for polyvinyl chloride or copolymers of vinyl chloride containing mainly vinyl chloride units. The polymers or copolymers can be prepared by well known methods, such as the suspension, emulsion or mass polymerization. Their K-value lies between 35 and 80.

The addition of 0.2 to 5% by weight of the stabilizer mixture, calculated for polyvinyl chloride or the mentioned copolymers, is generally adequate for the development of a good effect.

The stabilizer combinations according to the invention can be used with vinyl chloride containing thermoplastics as stabilizers for the manufacture of pipes, boards, rolled sheets, foils and other half-finished goods of PVC as well as of other polymers based on vinyl chloride that are formed with heat.

In the manufacture of pipes, profiles and foils, using one of the described stabilizer combinations, 0.5 to 1 part by weight of paraffin with a melting point of 50° to 90° C. and/or free fatty acid with 8 to 22 carbon atoms can be used also to advantage in addition per 100 parts by weight of polymer based on vinyl chloride. In the manufacture of hollow parts and foils, the addition of 0.5 to 3 parts by weight of epoxidized soybean oil and 0.1 to 0.8 part by weight of higher molecular weight ester wax per 100 parts by weight of thermoplastic polymer or polyvinyl chloride is frequently advantageous.

The following specific embodiments are illustrative of the practice of the invention without being deemed limitative in any manner.

EXAMPLE 1

A mixture was prepared of 100 parts by weight of suspension PVC (K-value 70) and 3.4 parts by weight of the following mixture:

| Grams | |
|---|---|
| 10.0 | Calcium stearate |
| 5.0 | Zinc stearate |

| Grams | -continued |
| --- | --- |
| 2.0 | Stearic acid |
| 2.0 | Paraffin |
| 5.0 | The pentaerythritol ester of stearic acid (molar ratio 1:1.5) |
| 10.0 | Sodium salt of ascorbic acid. |

The milled sheets with a thickness of 0.5 mm that were to be tested for heat stability were prepared on a laboratory plastic rolling mill (450×220 mm) within five minutes at a roll temperature of 170° C. and 30 rpm. The actual testing of the static thermostability was performed in a drying oven (Heraeus) with six rotating baffles at a temperature of 180° C. The samples were removed from the oven and judged by visual inspection periodically. The end of the stability period was reached after a test period of 60 minutes.

Comparison Test:

When the sodium salt of ascorbic acid was omitted from an otherwise identical processing method, the end of the stability period occurred after 40 minutes.

EXAMPLE 2

The procedure was the same as described in Example 1, but with the variation that gluconic acid or gluconates were used instead of sodium ascorbate. The time, in minutes, to the end of the stability is recorded for the different stabilizers in Table 1 below.

TABLE 1

| Stabilizer | Minutes (End of Stability) |
| --- | --- |
| Gluconic acid | 70–100 |
| Na salt of gluconic acid | 100–120 |
| Ca salt of gluconic acid | 100 |

EXAMPLE 3

The procedure was the same as described in Example 2, but with the variation that instead of the sodium gluconate alone (with the calcium stearate, zinc stearate, stearic acid, paraffin and pentaerythrityl stearate), 50% of the sodium gluconate was now replaced by either the 2-ethylhexyl ester of thioglycolic acid or benzoyl-stearoylmethane. The initial color is improved by these additions.

The results, as explained in the preceding examples, are compiled in Table 2 below.

TABLE 2

| Parts by Weight | Polyhydroxy Stabilizer Addition (per 100 parts by weight PVC) | Minutes First Discolorations | Minutes End of Stability |
| --- | --- | --- | --- |
| 1.0 | Na salt of gluconic acid | 5 | 100–200 |
| 0.5 | Na salt of gluconic acid | 20 | 80 |
| 0.5 | 2-ethylhexyl ester of thioglycolic acid | | |
| 0.5 | Na salt of gluconic acid | 20 | 80 |
| 0.5 | Benzoyl-stearoyl-methane (0.5 part per 100 parts PVC) | 20 | 100 |
| 1.0 | Na—Al—silicate 19% H$_2$O (zeolite type Na A) | | |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A stabilized thermoplastic composition comprised of polyvinyl chloride or mixed polymers containing mainly vinyl chloride units and a stabilizer additive composition of:
   (1) heat stabilizers selected from the group consisting of metallic soaps, metallic phenolates and naphthenates and organotin compounds, and
   (2) other conventional additives employed in thermoplastic compositions,
wherein said heat stabilizers include from 0.02 to 5 parts by weight, per 100 parts by weight of polymer, of at least one aliphatic compound selected from the group consisting of gluconic acid, glucuronic acid, ketogluconic acid, ascorbic acid, alkali metal salts of said acids, alkaline earth metal salts of said acids, and mixtures thereof.

2. The stabilized thermoplastic composition of claim 1 wherein said metallic soaps consist essentially of from 0.5 to 5 parts by weight of calcium salts of fatty acids with from 8 to 22 carbon atoms and 0.2 to 2 parts by weight of zinc salts of fatty acids with from 8 to 22 carbon atoms, both based on 1 part by weight of said aliphatic hydroxyl-containing hydrocarbon.

3. A stabilized thermoplastic composition comprised of polyvinyl chloride or mixed polymers containing mainly vinyl chloride units and a stabilizer additive composition of:
   (1) heat stabilizers selected from the group consisting of metallic phenolates and naphthenates, and organotin compounds, and
   (2) other conventional additives employed in thermoplastic compositions,
wherein said heat stabilizers include:
   (a) from 0.2 to 5 parts by weight, per 100 parts by weight of polymer, of at least one aliphatic compound selected from the group consisting of gluconic acid, glucuronic acid, ketogluconic acid, ascorbic acid, alkali metal salts of said acids, alkaline earth metal salts of said acids and mixtures thereof,
   (b) from 0.05 to 5 parts by weight, per 1 part by weight, of said aliphatic compound, of at least one calcium salt of fatty acids with from 8 to 22 carbon atoms, and
   (c) from 0.2 to 2 parts by weight, per 1 part by weight of said aliphatic compound, of at least one zinc salt of fatty acids with from 8 to 22 carbon atoms.

4. The stabilized thermoplastic composition of claim 1 or 3 having a further content of from 0.2 to 5 parts by weight, per 1 part by weight of said aliphatic compound, of a synthetic, crystalline powdered sodium aluminosilicate containing from 13% to 25% by weight of water of crystallization and having a composition ratio on the anhydrous basis of:

0.7 to 1.1 Na$_2$O:1 Al$_2$O$_3$:1.3 to 2.4 SiO$_2$.

5. The stabilized thermoplastic composition of claim 1 or 3 having a further content of from 0.2 to 2.0 parts by weight, per 1 part by weight of said aliphatic compound, of a partial ester of lower alkanepolyols or lower alkoxy-lower alkanepolyols with fatty acids having from 8 to 22 carbon atoms, said partial ester having an OH-number of from about 140 to about 580.

6. The stabilized thermoplastic composition of claim 4 having a further content of from 0.2 to 2.0 parts by weight, per 1 part by weight of said aliphatic compound, of a partial ester of lower alkanepolyols or lower alkoxy-lower alkanepolyols with fatty acids having from 8 to 22 carbon atoms, said partial ester having on OH-number of from about 140 to about 580.

7. The stabilized thermoplastic composition of claim 1 or 3 having a further content of from 0.1 to 3.0 parts by weight, per 1 part by weight of said aliphatic compound, of an ester of thioglycolic acid with an alkanol having from 3 to 36 carbon atoms or an ester or partial ester of thioglycolic acid with an alkanepolyol having from 3 to 36 carbon atoms and 2 to 6 hydroxyl groups.

8. The stabilized thermoplastic composition of claim 4 having a further content of from 0.1 to 3.0 parts by weight, per 1 part by weight of said aliphatic compound, of an ester of thioglycolic acid with an alkanol having from 3 to 36 carbon atoms or an ester or partial ester of thioglycolic acid with an alkanepolyol having from 3 to 36 carbon atoms and 2 to 6 hydroxyl groups.

9. The stabilized thermoplastic composition of claim 5 having a further content of from 0.1 to 3.0 parts by weight, per 1 part by weight of said aliphatic compound, of an ester of thioglycolic acid with an alkanol having from 3 to 36 carbon atoms or an ester or partial ester of thioglycolic acid with an alkanepolyol having from 3 to 36 carbon atoms and 2 to 6 hydroxyl groups.

10. The stabilized thermoplastic composition of claim 1 or 3 wherein said organotin compounds are present in an amount of from 0.05 to 1.0 part by weight, per 1 part by weight of said aliphatic compound.

11. The stabilized thermoplastic composition of claim 1 or 3 having a further content of from 0.02 to 0.5 part by weight, per 1 part by weight of said aliphatic compound, of a 1,3-dicarbonyl compound having the formula:

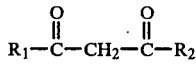

wherein $R_1$ and $R_2$ are members selected from the group consisting of alkyl having from 3 to 24 carbon atoms, phenyl, and phenylalkyl having from 1 to 8 carbon atoms in the alkyl.

12. The stabilized thermoplastic composition of claim 4 having a further content of from 0.02 to 0.5 part be weight, per 1 part by weight of said aliphatic compound, of a 1,3-dicarbonyl compound having the formula:

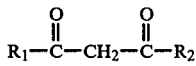

wherein $R_1$ and $R_2$ are members selected from the group consisting of alkyl having from 3 to 24 carbon atoms, phenyl, and phenylalkyl having from 1 to 8 carbon atoms in the alkyl.

13. The stabilized thermoplastic composition of claim 5 having a further content of from 0.02 to 0.5 part by weight, per 1 part by weight of said aliphatic compound, of a 1,3-dicarbonyl compound having the formula:

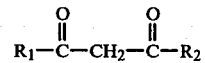

wherein $R_1$ and $R_2$ are members selected from the group consisting of alkyl having from 3 to 24 carbon atoms, phenyl, and phenylalkyl having from 1 to 8 carbon atoms in the alkyl.

14. The stabilized thermoplastic composition of claim 7 having a further content of from 0.02 to 0.5 part by weight, per 1 part by weight of said aliphatic compound, of a 1,3-dicarbonyl compound having the formula:

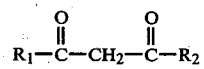

wherein $R_1$ and $R_2$ are members selected from the group consisting of alkyl having from 3 to 24 carbon atoms, phenyl, and phenylalkyl having from 1 to 8 carbon atoms in the alkyl.

15. In the process of extruding a thermoplastic composition in the form of pipes, profiles and foils by passing a hot thermoplastic composition through a die orifice, the improvement consisting of using the thermoplastic composition of claim 1 or 3 mixed with from 0.5 to 1 part by weight, per 100 parts by weight of polymer, of paraffin with a melting point of from 50° C. to about 90° C., or free fatty acid with 8 to 22 carbon atoms or a mixture of said fatty acid and said paraffin.

16. In the process of forming hollow parts and foils by hot-forming a thermoplastic composition, the improvement consisting of using the thermoplastic composition of claim 1 or 3 mixed with from 0.5 to 5 parts by weight, per 100 parts by weight of polymer, of epoxidized soybean oil and from 0.1 to 0.8 parts by weight, per 100 parts by weight of polymer, of a high molecular weight ester wax.

17. A stabilizer mixture for addition to a thermoplastic comprised of polyvinyl chloride or mixed polymers containing mainly vinyl chloride units consisting essentially of:
(1) heat stabilizers for said thermoplastic selected from the group consisting of metallic phenolates and naphthenates, and organotin compounds, and
(2) other conventional additives employed in thermoplastic compositions,
wherein said heat stabilizers include from 0.02 to 5 parts by weight, per 100 parts by weight of polymers, of at least one aliphatic compound selected from the group consisting of gluconic acid, glucuronic acid, ketogluconic acid, ascorbic acid, alkali metal salts of said acids, alkaline earth metal salts of said acids and mixtures thereof.

18. A stabilizer mixture for addition to a thermoplastic comprised of polyvinyl chloride or mixed polymers containing mainly vinyl chloride units consisting essentially of:
(a) 1 part by weight, per 100 parts by weight of polymer, of at least one aliphatic compound selected from the group consisting of gluconic acid, glucuronic acid, ketogluconic acid, ascorbic acid, alkali metal salts of said acids, alkaline earth metal salts of said acids, and mixtures thereof,
(b) from 0.5 to 5 parts by weight, per 1 part by weight of said aliphatic compound, of at least one calcium salt of fatty acids with from 8 to 22 carbon atoms, and (c) from 0.2 to 2 parts by weight, per 1 part by weight of said aliphatic compound, of at least one zinc salt of fatty acids with from 8 to 22 carbon atoms.

19. The stabilizer mixture of claim 17 or 18 having a further content of from 0.2 to 5 parts by weight, per 1 part by weight of said aliphatic compound, of a synthetic, crystalline powdered sodium aluminosilicate containing from 13% to 25% by weight of water of crystallization and having a composition ratio on the anhydrous basis of:

0.7 to 1.1 $Na_2O$: 1 $Al_2O_3$: 1.3 to 2.4 $SiO_2$.

20. The stabilizer mixture of claim 17 or 18 having a further content of from 0.2 to 2.0 parts by weight, per 1 part by weight of said aliphatic compound, of a partial ester of lower alkanepolyols or lower alkoxy-lower alkanepolyols with fatty acids having from 8 to 22 carbon atoms, said partial ester having an OH-number of from 140 to about 580.

21. The stabilizer mixture of claim 19 having a further content of from 0.2 to 2.0 parts by weight, per 1 part by weight of said aliphatic compound, of a partial ester of lower alkanepolyols or lower alkoxy-lower alkanepolyols with fatty acids having from 8 to 22 carbon atoms, said partial ester having an OH-number of from 140 to about 580.

22. The stabilizer mixture of claim 17 or 18 having a further content of from 0.1 to 3.0 parts by weight, per 1 part by weight of said aliphatic compound, of an ester of thioglycolic acid with an alkanol having from 3 to 36 carbon atoms or an ester or partial ester of thioglycolic acid with an alkanepolyol having from 3 to 36 carbon atoms and 2 to 6 hydroxyl groups.

23. The stabilizer mixture of claim 19 having a further content of from 0.1 to 3.0 parts by weight, per 1 part by weight of said aliphatic compound, of an ester of thioglycolic acid with an alkanol having from 3 to 36 carbon atoms or an ester or partial ester of thioglycolic acid with an alkanepolyol having from 3 to 36 carbon atoms and 2 to 6 hydroxyl groups.

24. The stabilizer mixture of claim 21 having a further content of from 0.1 to 3.0 parts by weight, per 1 part by weight of said aliphatic compound, of an ester of thioglycolic acid with an alkanol having from 3 to 36 carbon atoms or an ester or partial ester of thioglycolic acid with an alkanepolyol having from 3 to 36 carbon atoms and 2 to 6 hydroxyl groups.

25. The stabilizer mixture of claim 17 or 18 having a further content of from 0.02 to 0.5 part by weight, per 1 part by weight of said aliphatic compound, of a 1,3-dicarbonyl compound having the formula:

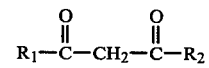

wherein $R_1$ and $R_2$ are members selected from the group consisting of alkyl having from 3 to 24 carbon atoms, phenyl, and phenylalkyl having from 1 to 8 carbon atoms in the alkyl.

26. In the process for stabilizing a thermoplastic comprised of polyvinyl chloride or mixed polymers containing mainly vinyl chloride units comprising mixing a stabilizer mixture with said thermoplastic prior to further processing said thermoplastic, the improvement consisting essentially of using from about 0.2 to about 5 parts by weight of the stabilizer mixture of claim 17 or 18, per 100 parts by weight of polymer, as said stabilizer mixture.

* * * * *

UNITED STATES PATENT AND TRADEMARK OFFICE
CERTIFICATE OF CORRECTION

PATENT NO. : 4,380,597
DATED : April 19, 1983
INVENTOR(S) : WERNER ERWIED et al.

It is certified that error appears in the above-identified patent and that said Letters Patent are hereby corrected as shown below:

Column 2, line 45: "Further more" should read --Furthermore--.
Column 5, Table 2, should read:

| Parts by Weight | Polyhydroxy Stabilizer Addition (per 100 parts by weight PVC) | MINUTES First Discolorations | End of Stability |
|---|---|---|---|
| 1.0 | Na salt of gluconic acid | 5 | 100-200 |
| 0.5 | Na salt of gluconic acid | 20 | 80 |
| 0.5 | 2-ethylhexyl ester of thioglycolic acid | | |
| 0.5 | Na salt of gluconic acid | 20 | 80 |
| 0.5 | Benzoyl-stearoyl methane | | |
| 0.5 | Na salt of gluconic acid | | |
| 0.5 | Benzoyl-stearoyl-methane (0.5 part per 100 parts PVC) | 20 | 100 |
| 1.0 | Na-Al-silicate 19% $H_2O$ (zeolite type Na A) | | |

UNITED STATES PATENT AND TRADEMARK OFFICE
CERTIFICATE OF CORRECTION

PATENT NO. : 4,380,597

DATED : April 19, 1983

INVENTOR(S) : WERNER ERWIED et al.

It is certified that error appears in the above-identified patent and that said Letters Patent are hereby corrected as shown below:

Column 7, line 50: "be" should read --by--.

Signed and Sealed this

Twenty-second Day of May 1984

[SEAL]

Attest:

GERALD J. MOSSINGHOFF

Attesting Officer

Commissioner of Patents and Trademarks